United States Patent [19]
Drummond et al.

[11] 3,818,688
[45] June 25, 1974

[54] COMPOSITE INTEGRATED RAKE AND APPARATUS AND METHOD OF MANUFACTURE THEREOF

[76] Inventors: W. Wendell Drummond, 4173 Timberlane Dr., Allison Park, Pa. 15101; Walter J. Hegedus, 30 Park Rd., Pittsford, N.Y. 14534

[22] Filed: June 27, 1972

[21] Appl. No.: 266,537

[52] U.S. Cl. ............................................ 56/400.01
[51] Int. Cl. ................................................ A01d 7/02
[58] Field of Search....... 56/400.17, 400.01, 400.02, 56/400.13, 400.17, 400.18, 295; 164/137

[56] References Cited
UNITED STATES PATENTS

| | | | |
|---|---|---|---|
| 2,083,922 | 6/1937 | Roessel | 56/400.13 |
| 2,463,393 | 3/1949 | Key | 56/400.17 |
| 3,119,888 | 1/1964 | Supitilov | 264/137 |
| 3,279,159 | 10/1966 | Paul | 56/295 |
| 3,304,356 | 2/1967 | Palmai | 264/137 |
| 3,336,426 | 8/1967 | Boggs | 264/137 |
| 3,340,682 | 9/1967 | Ely | 56/295 |
| 3,476,625 | 11/1969 | Slivinsky et al. | 264/137 X |
| 3,530,212 | 9/1970 | Kienle et al. | 264/137 |
| 3,654,754 | 4/1972 | Scoggin, Jr. et al. | 56/400.17 |
| 3,703,396 | 11/1972 | Lamanche et al. | 264/137 |
| 3,707,835 | 1/1923 | McNally et al. | 56/400.01 |
| 3,724,188 | 4/1973 | Eads | 56/400.17 |

*Primary Examiner*—Russell R. Kinsey
*Attorney, Agent, or Firm*—Carothers & Carothers

[57] ABSTRACT

An article of manufacture in the form of a composite integrated rake having a series of parallel or radially aligned resin bonded tines each integral at a common end to a resin bonded stockhead. Each of the tines have substantially unidirectional reinforcement comprising parallel rovings of filamentary material contiguous with a part of the stockhead. The stockhead comprises, in combination with contiguous tine rovings, superimposed unidirectional filamentary rovings transposed in a direction transverse to the direction of the contiguous tine rovings.

The method of manufacturing the rake includes the reciprocal passage of resin dipped rovings deposited in spaced slots forming rake tines in combination with transversely disposed resin dipped rovings deposited before and/or after depositing of the tine roving to form the integrated stockhead of the rake, followed by curing of the composite rake structure.

17 Claims, 12 Drawing Figures

COMPOSITE INTEGRATED RAKE AND APPARATUS AND METHOD OF MANUFACTURE THEREOF

BACKGROUND OF THE INVENTION

This invention relates to a hand rake or other such yard and garden implement and more particularly to a rake structure embodying integrated synthetic strands and rovings, resin inpregnated, to form a plurality of tines and stockhead, which upon being cured produces an unusually light implement but having exceedingly high strength over prior art implements of comparable strength over weight factor, such as, the common bamboo rake.

Rakes on the market today are not uncommon to anyone. One of the most preferred rakes obtainable is the bamboo rake because of its light weight and desirable springiness of the bamboo tines, which provides a very useful implement for raking bulky materials such as leaves and grass clippings. In recent times, steel tine rakes have invaded the implement market, particularly because of lower manufacturing costs and improved durability and strength over bamboo rakes. However, the weight of such implements is increased, making their continued use more tiring and cumbersome and making the job of raking a more menial task. Also, steel tines, although having the desired flexure property, do permanently bend out of shape after continuous or excessive use, and are readily subject to corrosion, which is not true of bamboo tines.

The natural structure of bamboo is very suitable for applications such as tines for a rake implement because of its natural filamentary composite consisting of parallel fibers running unidirectionally, the fibers being bound together by natural pulp between the fibers to form a rather strong yet flexible structure. However, it is not uncommon to find that over a period of time, bamboo tines become broken due to excessive or improper use of the bamboo rake or due to deteriorating conditions, such as environmental conditions, that effect the strength of this natural material.

Also, in such bamboo implements as well as most steel tined rakes, the tines must be held in fixed but flexible relation with clips, pins, wires, springs, etc., thereby adding not only to the cost of manufacture but also necessitating complicated support assemblies usually in the area of the stockhead of the implement. Such assemblies also add to the weight of the implement and also quicken the destruction of the implement in the sense that such assemblies become entangled or caught frequently by other objects, causing such assemblies to become pulled and twisted and finally broken.

In summary, there is a need to improve the structure of such implements, while maintaining simplicity and obtaining a reduction of its overall weight, but simultaneously improving the strength-to-weight factor.

Rake implements have been suggested in the past using materials having a built-in degree of resiliency in the tines, such as suggested in U.S. Pat. No. 1,780,748 where the rake tines are rubber. However, we are unaware of any suggestion in the art of producing, on a large scale, resin bonded filamentary tines constructed to be integral with the stockhead through a cross-lamination technique herein disclosed.

To be sure glass fiber reinforced synthetic structural members have high flexural strength and have been fabricated in the past using glass filament rovings together with a resin subjected to pressure in a hot mold to cure the resin to produce articles such as leaf springs disclosed in U.S. Pat. No. 3,530,212 (264–137). However, there is no teaching or reference to the manufacture of such articles where cross-lamination is involved. Another such example of reinforced glass fiber articles is disclosed in U.S. Pat. No. 2,749,266 wherein the resin inpregnated fibers are wound on a rotating drum in a direction normal to the axis of the drum, which upon being cured, can be formed into boat hulls, airplane pontoons, tanks, and the like.

SUMMARY OF THE INVENTION

The principal object of this invention is the provision of a composite integrated rake structure wherein the series of spaced parallel or radially aligned tines of the structure and the integral stockhead each comprise substantially unidirectional rovings of synthetic filamentary material which are contiguous with the stockhead and with additional rovings forming the stockhead transposed in a substantially transverse direction relative to the tines to form a cross-lamination. Such filamentary material has very high strength when resin bonded and cured and may consist of such materials as glass or carbon fibers or other organic fibers arranged in longitudinal lengths to form rovings. Such materials may be held by thermoset types of resins, such as polyester or epoxy resins, or by thermoplastic type resins, such as Nylon, Dacron or polypropylene resin. In the case of thermoset resins, the composite rake structure is cured by heat whereas in the case of thermoplastic resins, the structure is cured by cooling. In any case, the elongated handle for the rake implement may be cured as positioned in the stockhead or mechanical clamps or other such devices may be added after curing by securing them to the stockhead with fasteners while also securing the handle to the stockhead.

Where the filamentary materials are oriented in parallel array and resin bonded and cured in the form of a series of rake tines, it has been found that they exhibit a much higher strength and flexibility than comparable bamboo rake tines. We have conducted flexure tests on bamboo tines compared to the filamentary material, resin bonded tines of the rake structure comprising this invention and have found that the bamboo tines on the average cannot withstand flexure forces much beyond 40 pounds pressure. However, the tines of the rake structure of the present invention can withstand flexure forces in excess of 80 pounds. These results demonstrate at least double the flexure strength which is an important factor in rake implements where flexure of the tines is a primary factor.

It is quite true that fiberglass reinforced plastics with its strength, yet added flexure factor is not new. The fiberglass fishing rod and vaulting pole are good examples of parallel arrays of fibers which are resin bonded and cured to provide high strength, flexibility and durability in the composite. The filament loading of such articles is commonly 60 to 80 percent fiber and 40 to 20 percent resin. The flexural and tensile strength of the composite is maximized by having the filamentary material arranged in parallel bundles so that it is common to obtain strengths of 150,000 p.s.i. to 200,000 p.s.i. in tensile and flexure.

This same composite property is utilized to achieve a light weight rake implement wherein the tines each consist of parallel strands of filamentary material such as glass fiber, resin bonded, which prove to be thinner and more flexible than bamboo tines without fear of breakage because of the excellent high strength of the composite. In this connection, it must be remembered that most of the load and action is on the tines of any rake implement when put to use so that the ability of high flexibility to provide for the necessary sweeping action in rake use without the fear of breakage becomes very desirable.

It has been found that a filament loading of 30 percent or more is desirable to obtain the combined strength and flexure level in the tines and stockhead.

With this in mind, a composite integrated rake structure having tines and a stockhead made of resin bonded filamentary material such as fiberglass made as a single cross-laminated unit by the method of this invention is the center point of the invention herein disclosed to produce a rake structure with tines having tensile strength as high as 200,000 p.s.i., but the weight of the structure one-half pound or less, a strength-to-weight factor not known in the prior art relating to rake implements. Also in following the method, a curvature may be imparted to the tines as is customary with such rake structures. Further, in the practice of the method, the spaced tines can be formed integral with the stockhead in a manner to be in parallel spaced relation or in a radially disposed relation.

In producing the stockhead, synthetic matting or fabric can be used as the filamentary material rather than aligned rovings. However, it is preferable to use unidirectional strands formed into rovings because of the added flexural strength-over-weight factor, previously discussed.

The resin bonded filamentary tines may be provided with a smooth continuous curvature having a radius of curvature anywhere from 6 inches to 30 inches, which curvature helps to provide tine strength and stiffness. An additional short curvature may be provided at the end portions of each of the tines having a radius of curvature of 2 inches to 4 inches to improve the rake's utility such as in leaf raking.

A filler material such as calcium carbonate or titanium oxides may be added to the resin to give more body to the resin and resultant rake structure thereby reducing the amount of resin necessary. Also, such filler material may add color to the rake structure as well as provide smoother and more uniform surface traits.

Another object of the present invention is the provision of a cross-piece integral with the ends of the rake tines opposite the stockhead to produce a shovel implement suitable for snow shoveling. The normal steel or aluminum snow shovel weighs 3 to 5 pounds, and when loaded with snow has a total weight of 6 to 10 pounds. The snow shovel structure of the present invention reduces this load factor to as little as 3 to 5 pounds. If desirable, the snow shovel structure can be converted into a rake implement by removal of the integral cross-piece.

Another object of the present invention is the provision of apparatus for manufacturing the rake structure comprising this invention utilizing a rotatably mounted annular mold, the upper and lower surfaces of which are each provided with a first series of annular grooves and a second series of radially disposed grooves for the full annular extent of the mold. Roving feeder means are provided to deposit resin dipped rovings in the grooves of special shaped molds in the annular ring as it is slowly rotated. After deposition, curing is brought about through the passage of a portion of the slow moving mold through a curing oven. Also, radial and circumferential cutoff means are provided to cut the deposited and cured rovings sequentially at various positions as the mold rotates out of the furnace. Also, circumferential severing is accomplished at the outer side perimeter of the mold thus producing on a continuous basis a plurality of rake structures prepared from mold surfaces on the upper and lower annular surfaces of the annular mold.

Other objects and advantages appear in the following description and claims.

The accompanying drawings show, for the purpose of exemplification without limiting the invention or the claims thereto, certain practical embodiments illustrating the principles of this invention wherein:

FIG. 1a is a plan view of a rake implement comprising this invention including the stockhead and a plurality of parallel tines consisting of resin impregnated rovings of filamentary material.

FIG. 1b is a cross-sectional view taken along the line b—b of FIG. 1a.

FIG. 2a is a plan view of the implement shown in FIG. 1a but further includes a transverse cross-piece molded integral to the ends of the rake tines opposite the stockhead to produce a shovel implement suitable for snow.

FIG. 2b is a cross-sectional view taken along the line b—b of FIG. 2a.

Figures 1A, 1B:
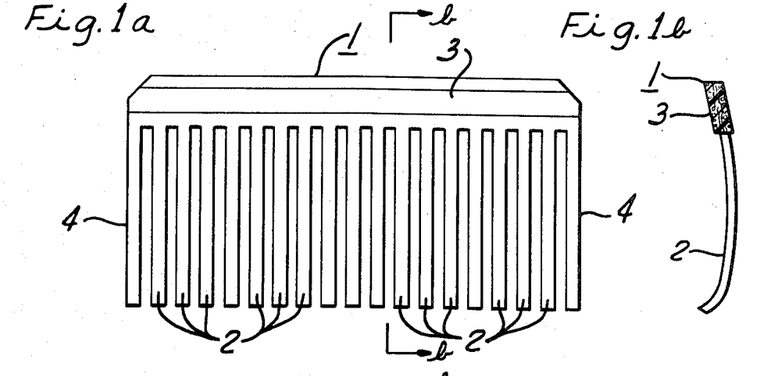

Reference is now made to FIG. 1a and FIG. 1b wherein there is illustrated the rake structure 1 comprising this invention which consists of a series of parallel and aligned resin bonded tines 2, each of which is integral at a common end to the resin bonded stockhead 3. Although it is quite difficult to illustrate in FIGS. 1a and 1b, each of the tines 2 is provided with substantially unidirectional reinforcement comprising parallel rovings of filamentary materials such as, glass or carbon fiber, and each is also integral with or penetrates into the stockhead 3 as indicated. The stockhead 3 also comprises tine rovings which are aligned in close parallel proximity to one another but transposed in a substantially transverse direction relative to the roving filamentary material making up the tines 2.

In the rake structure 1 shown in FIGS. 1a and 1b, it will be noted that each of the tines 2 is substantially parallel to one another and at right angles relative to the stockhead 3. The roving of filamentary material making up both tines 2 and stockhead 3 are resin impregnated prior to their disposition in a cross-laminated manner and thereafter cured to produce a high strength but yet flexible tined structure. It should be noted that in producing the stockhead 3 in a cross-laminated manner, the rovings of filimentary material making up the stockhead 3 can consist of two layers between which is transversely disposed, substantially at right angles, the rovings of filamentary material disposed in each of the tines 2.

Figure 3:
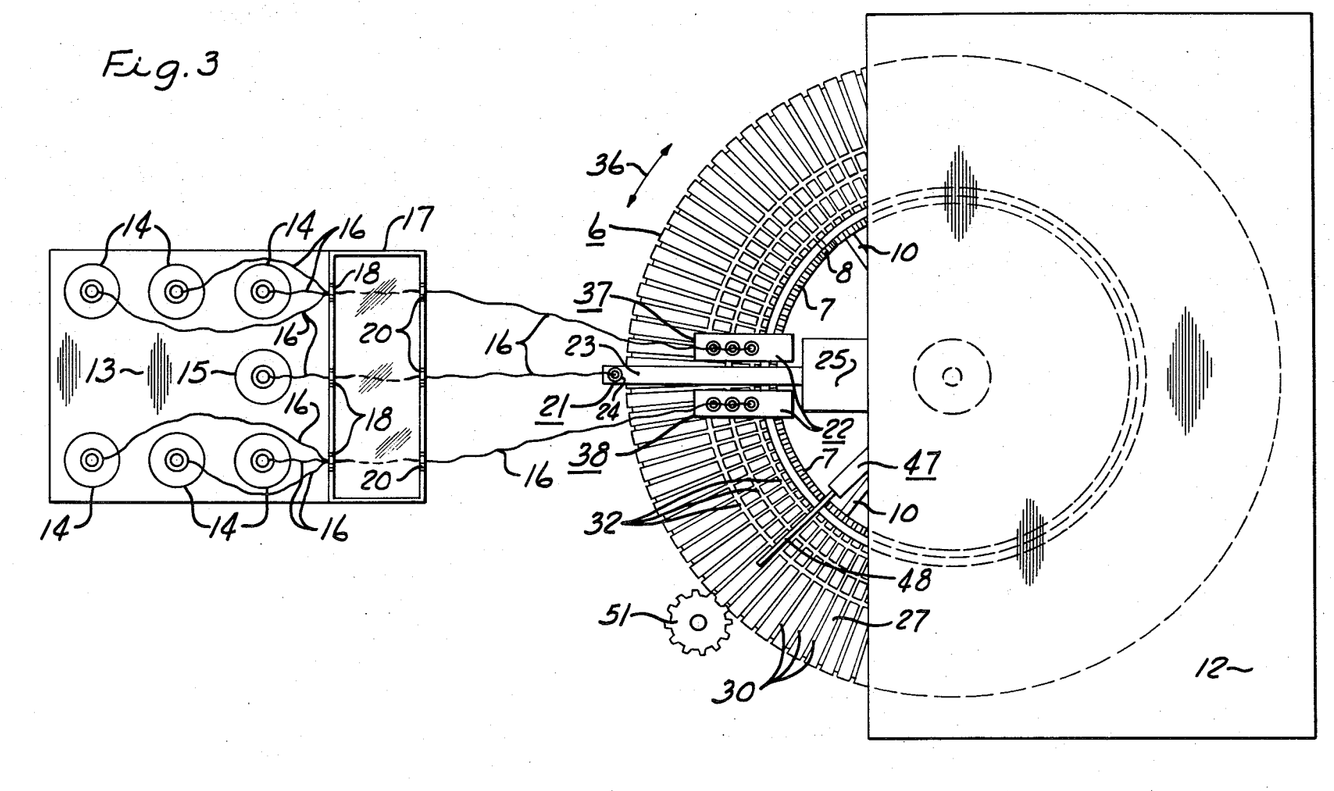
FIG. 3 is a schematic plan view illustrating apparatus that may be employed in the manufacture of reinforced rake implement comprising this invention.

In forming the tines 2 as shown in FIG. 3, a slight curvature can be imparted to the tines, such a radius of curvature within the range of 6 to 30 inches, which is quite prevalent in connection with tine rake structures on the market today. Furthermore, the ends 4 of each of the tines 2 may be adapted to have a tighter radius of curvature within the range of 2 to 4 inches, if desired.

The filamentary material making up the stockhead 3 could also consist of synthetic matting such as sheet molding compound material in lieu of a plurality of parallel-arranged rovings of filamentary material impregnated with resin.

Figures 2A, 2B:
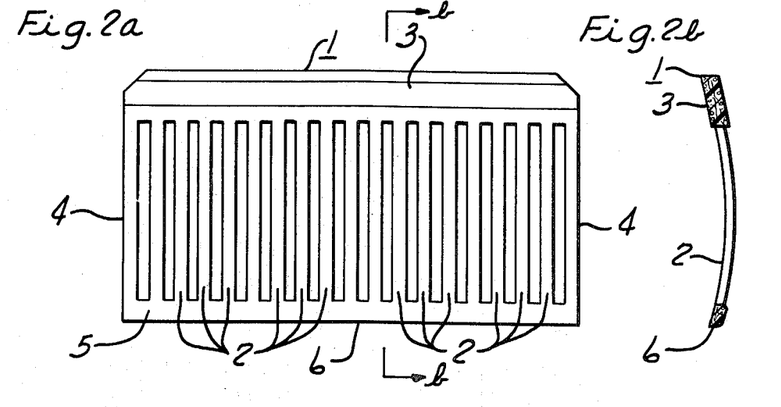

FIG. 2a substantially shows the same structure shown in FIG. 1a except with the addition of the laminated cross-piece 5 which is constructed similar to the stockhead 3 in that it consists of a plurality of parallel rovings of filamentary material as previously explained, sandwiched in a cross-laminated manner to be integral relative to the ends 4 of each of the tines 2. In this manner, a shovel implement can be readily adapted from the rake structure shown in FIG. 1a having a shovel edge 6 for the purpose of shoveling snow. It is true that there is spacing between the tines 2, but in view of the fact that snow has the property of conglomerating in a mass, snow will not readily fall between the tines 2 when being shoveled.

Reference should also be made of the fact that the tines 2 can also be disposed in a radial fan fashion similar to the bamboo rakes presently on the market. In connection with the apparatus shown in FIGS. 3 through 7 for producing a composite integrated rake structure 1, reference will be had to the manufacture of such rake structures having a series of radially disposed resin bonded tines.

Figure 4:
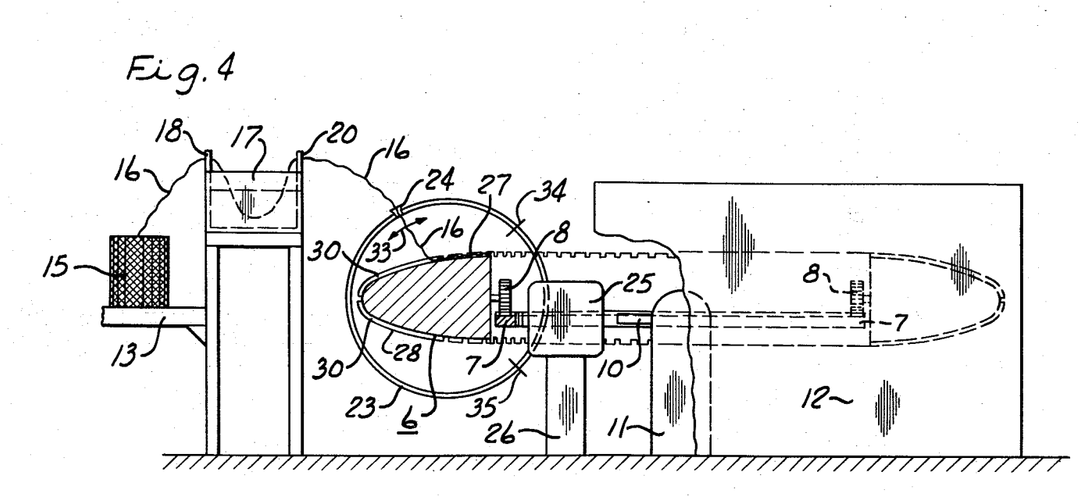
FIG. 4 is a schematic side elevation with parts in section and broken away of the apparatus shown in FIG. 3.
Figure 5:
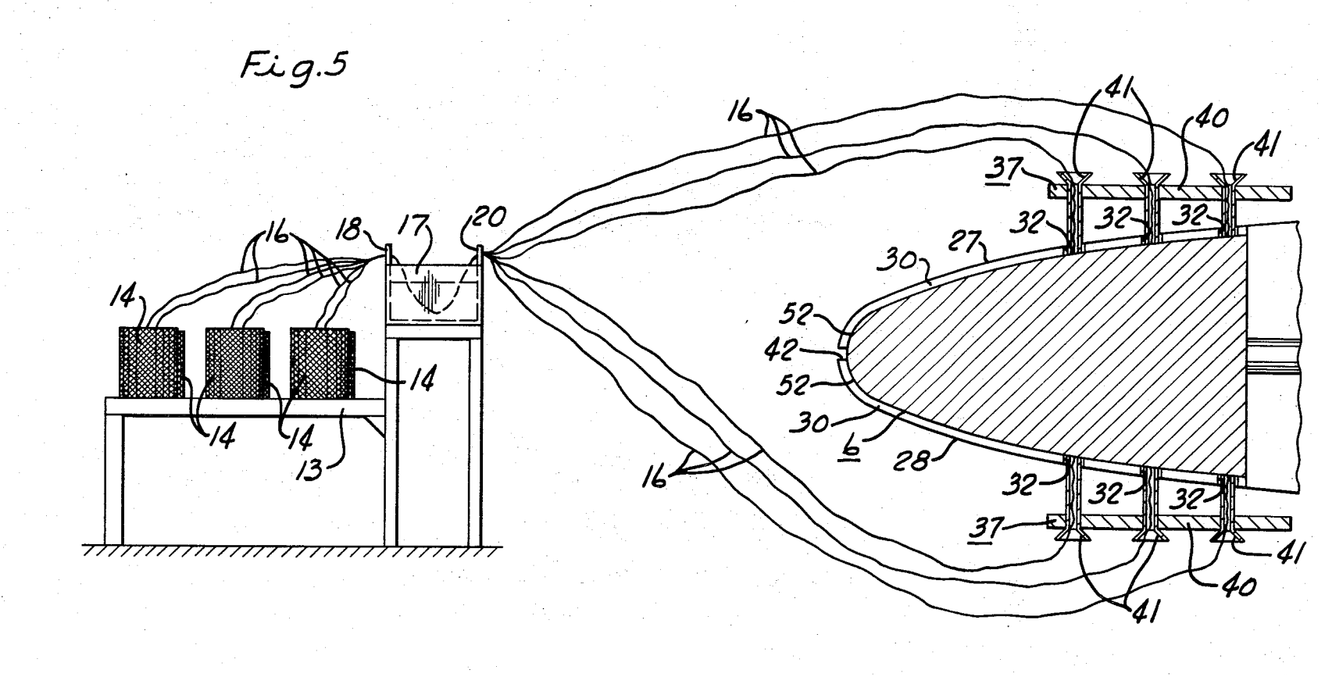
FIG. 5 is a partial schematic side elevation with parts in section of the apparatus shown in FIG. 3.

Thus, reference is made to FIGS. 3, 4 and 5 wherein there is shown apparatus capable of manufacturing a composite integrated rake structure 1 comprising this invention. It should be noted that the apparatus shown consists of an annular mold which is rotatably supported on the annular gear ring 7 and driven by means of the rotatable gears 8. The gear ring 7 as supported by means of the radially disposed members 10 from the central support stand 11.

A portion of the annular mold 6 is provided to rotate within a curing oven 12.

We are aware that there are many other methods that may be employed other than the use of an annular mold as disclosed. For example, in U.S. Pat. No. 3,530,212 (264–137), a pressed mold can be used as shown in this Patent to receive the mass of roving filamentary material to be pressed and cured to form the desired article shape. Equally adaptable would be the structure shown in U.S. Pat. No. 2,792,324 (154–83) utilizing a rotating cylindrical drum upon the surface of which is wound a plurality of resin impregnated rovings, to which can be applied transversely disposed rovings to form the necessary stockhead. In this connection, it should be noted that the cylindrical surface of such a rotating drum apparatus would provide the necessary curvature of the tines. However, we feel that the simplest and most preferred apparatus is shown in FIGS. 3 through 7, since such apparatus is simpler in design and is capable of producing composite integrated rake structures in a continuous and efficient manner.

As shown in FIGS. 3 through 5, a creel 13 is shown to support a plurality of roving spools 14, one of which is indicated at 15, the purpose of which will be explained later. The rovings 16 consist of a multitude of strands of filamentary material such as fiberglass, and they are drawn from the spools 14 and 15 through the resin-impregnating tank 17 by means of the guides and wipers 18 and 20, respectively. The rovings 16 are then directed to first and second roving feeder means, said first roving feeder means indicated at 21 whereas said second roving feeder means indicated at 22, as shown in FIG. 4 the first roving feeder means at 21 consists of the winding ring 23 having a radially disposed feeder 24 therein for directing the resin impregnated roving 16 onto the surfaces of the annular mold 6. Drive means 25 supported on the stand 26 is provided to drive winding ring 23 first in one direction and thence in the opposite direction so that the resin impregnated roving 16 is deposited on both the upper surface 27 and the lower surface 28 of the annular mold 6.

Again, reference is made to FIG. 3 in explanation of the mold surfaces 27 and 28. In FIG. 3, the upper mold surface 27 is shown and consists of a series of radially disposed grooves 30 which are intersected by a series of annularly disposed grooves 32. These grooves 30 and 32 may be substantially the same dimensional width and depth except preferably the annular grooves 32 may be somewhat wider and deeper, since these grooves form the stockhead 3 of the rake structure. Additional depth is desirable since the second roving feeder means 22 is preferably adapted to deposit roving in the annular grooves 32 before and after the depositing of roving by means of the first roving feeder means 21 in the grooves 30. Also in this connection, the roving 16 taken from the spool 15 on the creel 13 consists substantially of a larger multitude of roving strands than those found on spools 14 in order to provide sufficient tine thickness formed in the radially disposed grooves 30 so that the desired tine flexibility may be accomplished with the single passage of the first roving feeder means 21. However, it is within the contemplation of this disclosure that if necessary, two winding rings 23 may be employed for depositing separate sets of rovings 16 within the radially disposed grooves 30.

Reference is again made to FIG. 4 wherein the winding ring drive means 25 can rotatably drive the winding ring in the directions indicated by arrow 33 to a point shown at 34 where drive means 25 reverses its mode of operation to drive the winding ring 23 in the opposite direction to a point indicated at 35. From the explanation, it can be readily seen that the feeder 24 deposits the resin impregnated roving 16 in the radially disposed screws 30 in both the upper and lower surfaces 27 and 28, respectively, this being done in a continuous manner as the annular mold 6 is rotated in the direction of arrow 36 as shown in FIG. 3.

The drive means 25 need not be external as shown in FIG. 4, but may be housed within the annular ring 6 and connected to drive one of the gears 8.

In depositing the rovings 16 in the annular groove 32, the second roving feeder means 22 is provided to consist of two identical parts being roving feeder 37 and roving feeder 38. Roving feeder 37 is shown in FIG. 5 for both the upper and lower surfaces 27 and 28 of the annular mold 6, the roving feeder 38 being identical thereto.

The roving feeder 37 in each case consists of the support plate or bracket 40 held or supported in position by any suitable means within which are supported the three identical tubular feeders 41. The resin impregnated rovings 16 are fed through the tubular feeders 41 as the annular mold rotates, and as shown in FIG. 5 deposits the rovings 16 in the annular grooves 32. The resin impregnated rovings 16 are deposited in both the radially disposed grooves 30 and the annular disposed grooves 32 because of the adherent quality of the region in that, after being deposited in the grooves, the adherence therein is sufficient to cause the rovings 16 to be pulled through the resin impregnating tank 13 by the rotational force provided through rotation of the annular mold 6. However, suitable drawing means may be provided if found desirable in depositing the rovings 16 in the grooves 30 and 32.

From the foregoing description, it can be readily understood that upon rotation of the annular mold 6 in the direction of arrow 36, rovings 16 are first deposited in the annular grooves 32 by the roving feeders 38. Thereafter, the radially disposed rovings are deposited by means of the winding ring 23 in the radial grooves 30. Lastly, again, there is depositing of the roving 16 by means of the roving feeders 37 in the annular grooves 32. Thus, what is produced are a series of transversely disposed resin impregnated rovings which are cross-laminated in the form of a sandwich so that the rovings deposited in annular grooves 32 form the stockhead 3 whereas the rovings deposited in radially disposed grooves 30 form the tines 2 of the rake structure. In this connection, it should be noted that the upper mold surfaces 27 form a series of such rake structures whereas the under surface 28 forms another series of such rake structures wherein the corresponding ends of the tines of these plurality of rake structures are initially joined at the point of the circumferentially disposed grooves 42 as shown in FIGS. 4 and 5. The use of the groove 42 in the side portion of the annular mold 6 will be explained later.

Reference is now made to FIGS. 6a through 6d and FIG. 7 wherein these figures will be used in conjunction with explanation of the method of depositing the resin impregnated roving 16 in the radially disposed grooves 30 by use of the winding ring 23.

Figure 6A:
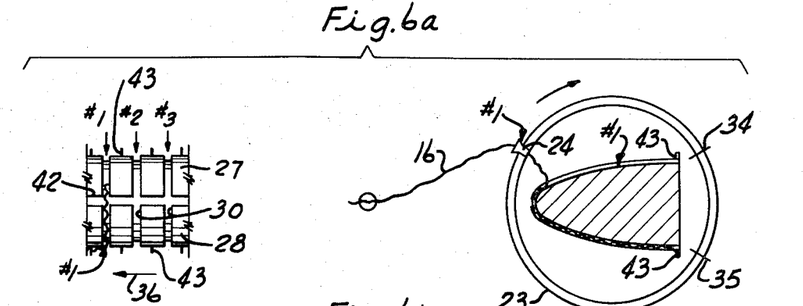
FIG. 6a is a first in a series of diagrammatic views showing the sequential operation of the roving feeder means of the apparatus of FIG. 3 for depositing in the mold the roving for producing the rake implement tines, this figure depicting the first position.
Figure 6B:
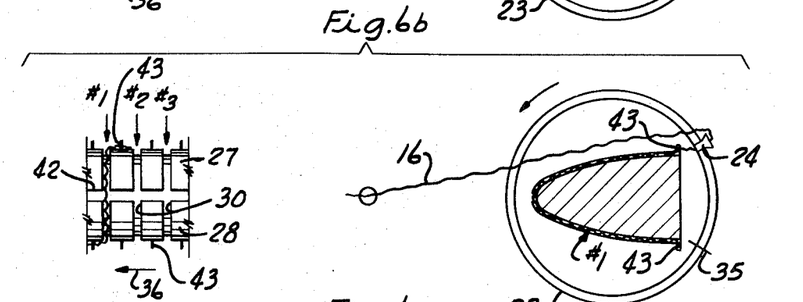
FIG. 6b is a second in a series of diagrammatic views showing the roving feeder means in the second sequential position.
Figure 6C:
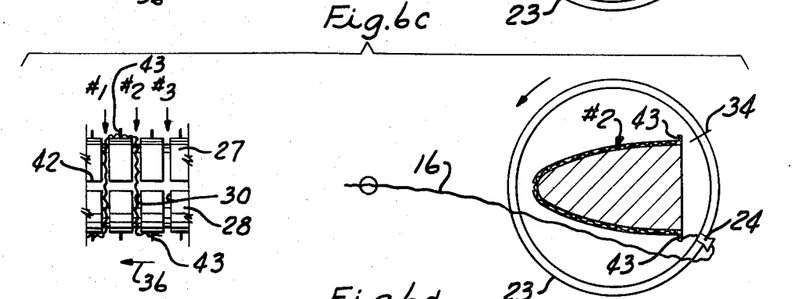
FIG. 6c is a third in a series of diagrammatic views showing the roving feeder means in the third sequential position.
Figure 6D:
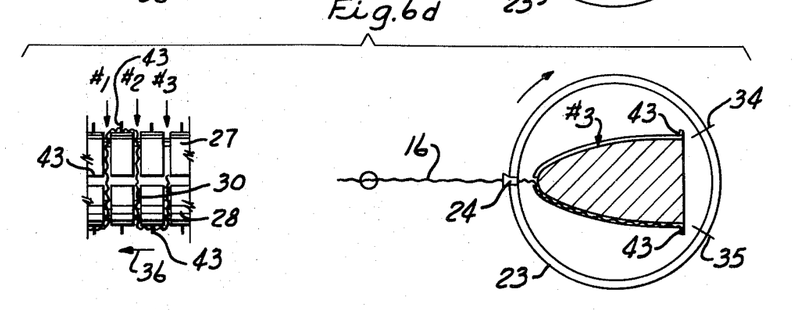
FIG. 6d is a fourth in a series of diagrammatic views showing the roving feeder means in the fourth sequential position.

In FIG. 6a as in connection with the other sequential figures 6b through 6d, shows on one side the diagrammatic view of three full grooves 30 disposed for their full length through the upper and lower mold surfaces 27 and 28. Each of these grooves 30 is indicated by a number position, number 1, 2 and 3. Thus, in FIG. 6a, the ring is rotated in the direction indicated toward the position 34 depositing the resin impregnated roving 16 in groove 30, which is specifically groove no. 1. Upon reaching the end point and traversing the end as indicated in FIG. 6b, when the feeder 24 is in the position 34 as shown in that figure, the operation of the winding ring 23 is reversed as indicated by the arrow in that figure to commence depositing of the resin impregnated roving 16 in groove number 2. Thus, rotation of the winding ring 23 continues in the direction of the arrow as indicated in FIG. 6b to the point where the feeder 24 of the winding ring 23 takes the position 35 which is indicated in FIG. 6 c. As indicated in this figure, the roving 16 has been completely deposited in groove 2.

From the foregoing description thus far, it can be understood that rotation of the annular mold in the direction indicated by arrows 36 is synchronized with the rotational movement of the winding rings 23 from position 34 to position 35 and vice versa, so that upon the feeder 24 reaching either of these positions 34 or 35, the rotation of the annular mold 6 has been sufficient around the pinpoints 43 to cause the roving 16 to be deposited in the next adjacent radially disposed groove 30 upon reverse directional movement of the winding ring 23. Thus, in the position shown in FIG. 6c, the feeder 24 having reached the position 35, the operation of the winding ring 23 is reversed as indicated in FIG. 6d, the rotational movement in the direction 36 of the annular mold 6 having been sufficient to cause the roving 16 to be deposited in the next adjacent radially disposed groove numbered 3.

From the foregoing explanation, it can be readily seen that the sequential depositing of the roving 16 in the radially disposed grooves is accomplished on a continuous basis as the winding ring 23 continually oscillates from its position shown at 34 to position shown at 35 and then back to position 34 as the annular mold 6 rotates in the direction indicated by arrow 36.

Figure 7:
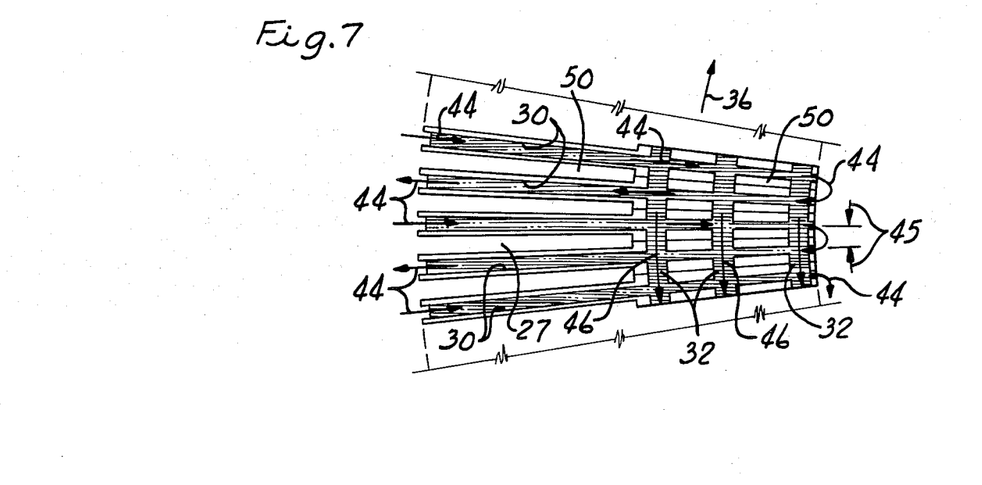
FIG. 7 is a partial plan view of a portion of the mold illustrating through arrows the depositing of the resin impregnated rovings in the annular grooves and radial grooves thereof.

The manner of sequential depositing is further made clear by reference to FIG. 7 wherein the sequence of arrows 44 indicate the manner of depositing the resin impregnated roving 16 in the radially disposed groove 30 as viewed from the upper mold surface 27 during rotation of the annular mold 6 in the direction of the arrow 36. It can be seen in this connection that very little rotation of the annular mold 6 is experienced before it completes depositing of the roving 16 in any radially disposed groove 30, which is indicated by the distance between the arrow 45. Arrows 46 indicate the depositing of the resin impregnated rovings 16 in the annular grooves 32 by means of the second roving feeder means 22.

Reference is again made to FIG. 3 wherein there is further shown the radial cutoff saw 47 having the radially disposed sawing means 48 adapted to be periodically operated at various radial cutoffs indicated at 50 in FIG. 7 for sequential separation of the rake structures comprising this invention.

The radial cutoff 47 is also provided not only in connection with upper mold surface 27 but also for periodic radial cutting in connection with the lower mold surface 28, although the lower radial cutoff saw 47 is not shown in the Figures.

Also shown in FIG. 3 is a circumferential cutoff means in the form of the radial saw at 51 positioned at the outer periphery of the annular mold 6 and adapted to have its cutting blade to cut within the circumferential groove 42.

Although the foregoing description of the apparatus for manufacturing the integrated composite rake comprising this invention was made evident with respect to explaining the structural features of the apparatus, the following explanation is given of the operation so that the manufacture of the composite integrated rake is understood from a position wherein the rovings are laid into the mold grooves to the final postion where the cutoff means are applied to remove the molded material from the mold 6.

As previously explained in connection with FIG. 3, as well as demonstrated in FIG. 7, roving feeders 37 initially deposit the roving 16 in the annular grooves 32 which form the stockhead 3 of the composite integrated rake structure. As the annular mold 6 always continues to rotate, the operation of the winding ring 23 through its feeder 24 deposits the roving 16 in the radially disposed grooves 30 both on the upper and lower mold surfaces 27 and 28 by means of continuous reciprocal operation between the designated positions indicated at 34 and 35. Thereafter, the roving feeders 38 supply roving 16 both to the annular groove 32 on the upper and lower surfaces 27 and 28 of the annular mold 6. Thus, what is formed is a sandwiched array of transversely disposed resin impregnated rovings.

Upon continual rotation of the mold 6, the deposited rovings within the annular grooves 30 and 32 are brought into the area of the curing furnace 12 wherein through the application of heat the resin impregnated rovings are bonded to form a composite unit. This molded and cured unit as it emerges from the furnace 12 is periodically cut off by means of the radial cutoff saw 47 with respect to both the upper and lower mold surfaces 27 and 28 in those places along the surfaces of the mold wherein there is a radially disposed cutoff groove indicated at 50 in FIG. 7. Also in operation it is the circumferential cutoff means in the form of the radial saw 51 adapted to cut the radially disposed rovings passing through the vicinity of the circumferential mold groove 42. Thus, what is produced is a plurality of continuously molded and bonded rake structures comprising a stockhead 3 consisting of cured rovings formed in annular grooves 32 in combination with transversely disposed radially aligned tines 2 formed in the groove 30. The number of tines desired in any given rake structure determines the period of time for radial cutoff by means of the radial cutoff saws 47.

The apparatus for producing the rake structure shown is not only unique in producing these rake structures on a continuous basis but also utilizing both upper and lower mold surfaces to separately but continuously produce a series of such rake structures.

With specific references to FIG. 5 particularly, it can be seen that the annular grooves 30 are provided with a curvature in order that the resultant tines 2 of the rake structure have a slight curve structure common with such rake implements. Furthermore, the ends of grooves 30 in the area of 52 are provided with an inwardly directed curved portion indicated at 52 so that the end of the formed tines 2 have the same inwardly directed curvature making them highly adaptable as a rake implement used in connection with raking leaves and grass clippings.

Molds having preformed grooves for each tine and for the stockhead provide cam surfaces for the entrance of the rovings as well as providing structural shape for the tines. It should be apparent that the depth and width of the tine can be controlled by the side walls of the groove. The tine rigidity strength is related to the thickness of the tine and therefore tine thickness can be increased by narrowing the groove which will increase depth of the tine where the material quantity remains unchanged. The grooves also provide smooth surfaces for three sides of the tine and the smooth outside or upper surface is achieved by the tension on the rovings. That is, the grooves also provide for a smooth surface for three faces of each of the tines, the fourth or upper face being given a smooth surface by depositing of the resin impregnated rovings in the transversely disposed grooves under some tension.

Thus, what is produced is a composite integrated rake structure composed of resin bonded filamentary materials as previously described cross laminated in such a manner to produce a high strength rake implement having tines which are highly flexible and incapable of being readily broken through continuous normal use.

The foregoing description, of course, sets forth the preferred embodiment of this invention, and in order to do so, specific terminology must be employed. In this connection, it should be noted that when using specific terminology in describing the preferred embodiment, it is intended only in the generic descriptive sense and not for any purpose of limiting the scope of the invention as defined in the claims.

We claim:

1. In a composite integrated rake structure, said rake comprising a resin bonded stockhead, a series of resin bonded rake tines projecting from said stockhead and integrally formed therewith, each of said tines having coextensive substantially unidirectional reinforcement comprising rovings of filamentary material one end of which penetrates said stockhead, said stockhead including said penetrating ends of said tine rovings in combination with superimposed unidirectional filamentary rovings disposed therein in a substantially transverse direction relative to the former.

2. The composite integrated rake structure of claim 1 characterized in that said tines have imparted thereto a curvature.

3. The composite integrated rake structure of claim 2 characterized in that the radius of curvature of said tines is within the range of 6 to 30 inches.

4. The composite integrated rake structure of claim 1 characterized in that a portion of the projecting ends of said tines have imparted thereto a curvature.

5. The composite integrated rake structure of claim 4 characterized in that the radius of curvature is within the range of 2 to 4 inches.

6. The composite integrated rake structure of claim 1 characterized by a filler material added to said resin.

7. The composite integrated rake structure of claim 1 characterized in that said filamentary materials comprise resin impregnated glass fiber rovings.

8. The composite integrated rake structure of claim 1 characterized in that said filamentary materials comprise resin impregnated carbon fiber rovings.

9. The composite integrated rake structure of claim 1 characterized in that said penetrating ends of said tine unidirectional filamentary material are sandwiched between said transverse superimposed unidirectional filamentary material in said stockhead.

10. The composite integrated rake structure of claim 1 characterized in that said resin is a thermoplastic resin material.

11. The composite integrated rake structure of claim 1 characterized in that said resin is a thermoset resin material.

12. In a composite integrated rake structure, said rake comprising a resin bonded stockhead, a series of resin bonded rake tines projecting from said stockhead and integrally formed therewith, each of said tines having coextensive substantially unidirectional reinforcement comprising rovings of filamentary material one end of which penetrates said stockhead, said stockhead including said penetrating ends of said tine unidirectional filamentary material in combination with superimposed strand filamentary material disposed therein in a direction substantially transverse relative to said unidirectional rovings, said filamentary materials being unitarily resin bonded to produce said composite integrated rake structure.

13. In a composite integrated rake structure, said rake comprising a series of radially disposed resin bonded tines each integrally joined at one end to a resin bonded stockhead, each of said tines having coextensive substantially undirectional reinforcement comprising rovings of filamentary material one end of which penetrates said stockhead, said stockhead including said penetrating ends of said tine rovings in combination with superimposed unidirectional filamentary rovings disposed in a substantially transverse direction relative to the former, said rovings resin bonded to produce said composite integrated rake structure.

14. The composite integrated rake structure of claim 13 characterized in that said stockhead transverse rovings are a series of spaced groups of rovings.

15. The composite integrated rake structure of claim 14 characterized in that said spaced stockhead transverse rovings are arcuate in extent, the radii of which are common with that of said radially disposed tines.

16. The composite integral rake structure of claim 13 characterized in that said spaced stockhead transverse rovings transverse over and under said tine rovings to form a composite sandwich stockhead.

17. The composite integral rake structure of claim 13 characterized in that said stockhead comprises stand mat filamentary material transposed in a direction substantially transverse relative to said unidirectional rovings.

* * * * *